(No Model.)

G. A. HOLMES.
FASTENING.

No. 574,904. Patented Jan. 12, 1897.

WITNESSES
E. F. Brown
A. H. Flannery

INVENTOR
Geo. A. Holmes
by Wm B. H. Dowse
Atty.

UNITED STATES PATENT OFFICE.

GEORGE A. HOLMES, OF CAMBRIDGE, MASSACHUSETTS, ASSIGNOR TO THE CONSOLIDATED FASTENER COMPANY, OF PORTLAND, MAINE.

FASTENING.

SPECIFICATION forming part of Letters Patent No. 574,904, dated January 12, 1897.

Application filed May 13, 1895. Serial No. 549,087. (No model.)

*To all whom it may concern:*

Be it known that I, GEORGE A. HOLMES, a citizen of the United States, residing at Cambridge, in the county of Middlesex and Commonwealth of Massachusetts, have invented a new and useful Improvement in Fastenings, of which the following is a full specification.

My invention relates to fastenings for shoes and other articles; and it consists of a device wherein one flap of the shoe or other article has attached to it a fixed adjusting socket-plate, while the other flap carries a stud adapted to engage with the said socket-plate.

In fastenings for shoes and like articles it is necessary to provide for a certain amount of take-up, so that the fastening can be pulled tightly over the ankle or instep. It is also desirable to be able to secure the fastening at different points, in order to vary the degree of tightness and adapt it for different sizes of instep. These points I have provided for in my fastening by making a socket-plate with a series of holes, with either of which the stud may be made to engage. The stud is also set back a slight distance from the end of the flap to which it is attached, thus leaving a tab beyond the stud, which may be grasped with the fingers in order to pull the stud over the hole in the socket-plate with which it is meant to engage.

Figure 1:
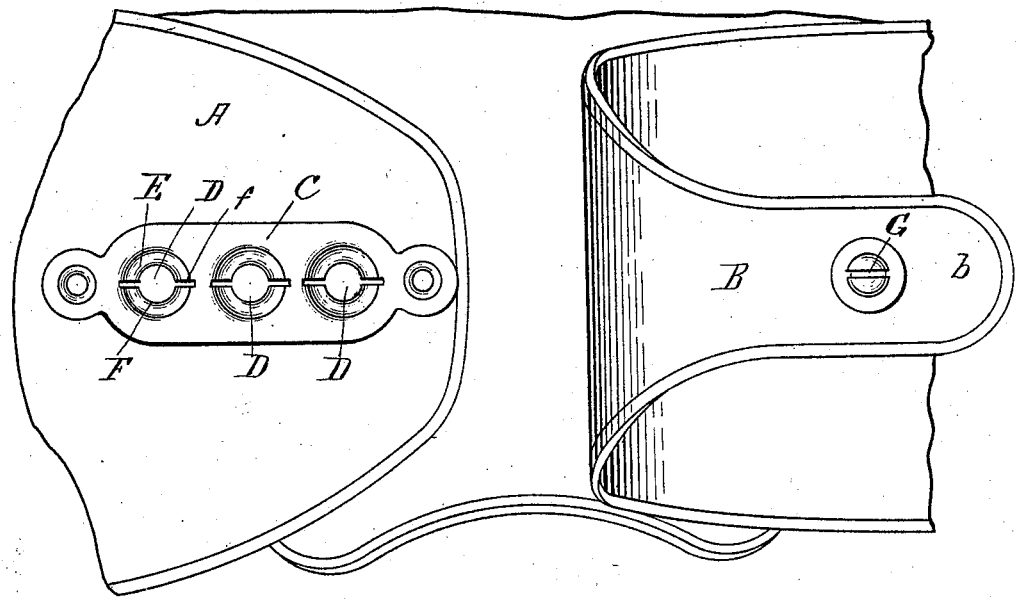
Figure 2:
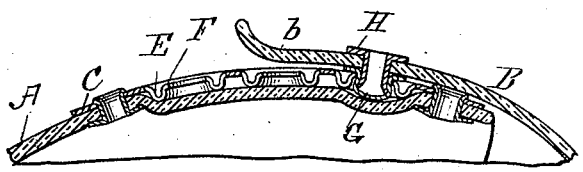

Referring to the accompanying drawings, Figure 1 shows in plan a portion of a shoe or other article having two flaps embodying my invention, the flap carrying the stud being shown turned back in order to show the stud on its under side. Fig. 2 is a longitudinal cross-section of my improved fastener.

In the drawings the two flaps of the shoe or other article are shown at A and B, respectively. The flap A is preferably made broad and has fixedly riveted, sewed, or otherwise attached thereto the socket-plate C, which is provided with a number of sockets D, arranged longitudinally.

The plate C is preferably made from one piece of metal, and is rounded longitudinally in order to conform to the shape of the ankle or instep and lie smoothly thereon.

The sockets D are struck up from the plate C into the shape shown in the section, Fig. 2, having a central perforation whose edge is formed by the upwardly-projecting lip F and the downwardly-projecting annular groove or corrugation E.

The inner edge of the lip F is turned in slightly, in order to engage with the neck of the stud, and the socket is made resilient by providing it with radial cuts *f*, extending outwardly through the lip F and annular groove E. In the drawings I have shown only two radial cuts, diametrically opposite, and I have placed these in line with the direction of the pull on the fastener, as I have found by this means that greater life and endurance is given the fastening.

The flap B is made preferably narrow and has attached to its under side a stud G, which has an enlarged head and contracted neck, with which the lip F of the socket D may engage when the two are snapped together. The stud G, I also preferably make slightly resilient by splitting the ball and neck, as shown in Fig. 1, and I have shown the stud attached to the flap by being riveted thereto by the eyelet H, whose head forms a cap on the top of the flap; but any form of stud could be used and attached to the under side of the flap in any suitable way.

I preferably attach the stud to the flap at a considerable distance from its end, so as to leave the flap or tab *b*, which serves not only as a grip to pull the stud over to the desired socket, but it also lies over and covers the socket-plate when the fastening is closed together, and thus gives an extremely neat appearance to the shoe or similar article upon which the fastening is used.

I am well aware that a draw-plate provided with a series of holes is old. I make no use of what has been known in buckle-fasteners as a "draw-plate," which is a plate flexibly attached at one end and adapted to perform the functions of a draw-plate. I have invented an adjusting socket-plate preferably fixed at both ends. I obtain all the advantages of a draw-plate by my combination of a stud with the flap B.

I claim—

An improvement in fastenings for shoes and other articles consisting of two flaps, A and B, wherein flap A is provided with a fixed, stationary, adjusting-plate C secured to its upper side, and having the depressed socket-corrugations E, with the reversed lips F, and wherein the flap B is provided with an adjusting-stud G placed on its under side near its end, substantially as described.

In witness whereof I have hereunto set my hand.

GEORGE A. HOLMES.

Witnesses:
WM. B. H. DOWSE,
A. H. FLANNERY.